United States Patent
Mao

(10) Patent No.: US 8,352,652 B2
(45) Date of Patent: Jan. 8, 2013

(54) USING ANALOG SIGNALS TO COMMUNICATE THROUGH AN A/D CONVERTER AND USB INTERFACE

(75) Inventor: Xiaodong Mao, Foster City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 254 days.

(21) Appl. No.: 12/360,386

(22) Filed: Jan. 27, 2009

(65) Prior Publication Data

US 2010/0174837 A1 Jul. 8, 2010

Related U.S. Application Data

(60) Provisional application No. 61/143,040, filed on Jan. 7, 2009.

(51) Int. Cl.
G06F 13/12 (2006.01)
G06F 13/38 (2006.01)

(52) U.S. Cl. ......................................................... 710/69
(58) Field of Classification Search ...................... 710/69
See application file for complete search history.

(56) References Cited

U.S. PATENT DOCUMENTS

| | | | | |
|---|---|---|---|---|
| 4,779,079 A * | 10/1988 | Hauck | ............................ | 345/168 |
| 7,039,534 B1 * | 5/2006 | Ryno et al. | ....................... | 702/63 |
| 7,639,656 B2 * | 12/2009 | Dooley et al. | .................. | 370/338 |
| 7,802,116 B2 | 9/2010 | Ravichandran | | |
| 2002/0032030 A1 | 3/2002 | Berglund et al. | | |
| 2002/0173329 A1 | 11/2002 | Hwang | | |
| 2004/0128137 A1 * | 7/2004 | Bush et al. | ..................... | 704/275 |
| 2005/0216606 A1 * | 9/2005 | Hayes et al. | ........................ | 710/5 |
| 2006/0035590 A1 * | 2/2006 | Morris et al. | ................. | 455/41.2 |
| 2006/0062582 A1 * | 3/2006 | Suzuki et al. | .................. | 398/183 |
| 2006/0173681 A1 * | 8/2006 | Koch et al. | ..................... | 704/246 |
| 2007/0005824 A1 | 1/2007 | Howard | | |
| 2007/0083685 A1 * | 4/2007 | Hsu et al. | ......................... | 710/69 |
| 2007/0288671 A1 | 12/2007 | Bohm | | |
| 2008/0039128 A1 | 2/2008 | Ostman et al. | | |
| 2008/0055245 A1 * | 3/2008 | Migliacio et al. | ............. | 345/158 |
| 2009/0002367 A1 | 1/2009 | Alexis | | |
| 2010/0058097 A1 | 3/2010 | Foster | | |

OTHER PUBLICATIONS

Vivek Alwayn, Fiber-Optic Technologies, Apr. 23, 2004, Cisco Press, http://www.ciscopress.com/articles/article.asp?p=170740&seqNum=11.*

* cited by examiner

Primary Examiner — Kris Rhu
(74) Attorney, Agent, or Firm — Kilpatrick Townsend and Stockton LLP

(57) ABSTRACT

Methods and systems for communicating information through a USB device with A/D converters are presented. Active components which provide analog signals to the A/D converters are switched off to cause spikes in the analog signals/channels. The spikes are digitized by the A/D converters and sent to the host through a USB interface. The active components are switched on and off in a pattern corresponding to a message, such that the host can determine the message from the resulting spikes. If multiple active components and A/D converters are used, then multiple 'bits' can be transmitted simultaneously using the different channels.

20 Claims, 12 Drawing Sheets

USING ANALOG SIGNALS TO COMMUNICATE THROUGH AN A/D CONVERTER AND USB INTERFACE

CROSS-REFERENCES TO RELATED APPLICATIONS

This application claims the benefit of U.S. Provisional Application No. 61/143,040, filed Jan. 7, 2009, hereby incorporated by reference in its entirety for all purposes.

This application is related to a U.S. patent application titled "Using USB Suspend/Resume To Communicate Information Through a USB Device" by the same inventor, filed concurrently.

BACKGROUND OF THE INVENTION

This application relates generally to the field of pulse or digital communications. Specifically, embodiments of this application relate to using suspend and active states of a Universal Serial Bus (USB)-compatible integrated circuit to communicate through the integrated circuit. Also specifically, embodiments of this application relate to using digital-to-analog (D/A) converters to communicate through a USB-compatible integrated circuit having analog-to-digital (A/D) converters.

Universal Serial Bus (USB) is a serial bus standard which allows devices to communicate to a host computer. USB is standardized by the USB Implementers Forum which is composed of computer, electronics, software, and related companies. The term USB refers to any of the revisions of the USB standard, including the popular USB 1.1 and 2.0 specifications, as well as communication buses complying with the specifications. USB also describes devices, adaptors, interfaces, and other circuits which are compatible with, but not necessarily certified as compliant with, any of the USB standards.

Other bus standards are also prevalent, such as IEEE 1394 (branded by such names as FireWire, i.LINK, and Lynx), HP-IL, RS-232, ATA, PCI, etc.; however, for simplicity and clarity this application will describe USB technologies in exemplary embodiments.

A plethora of integrated circuits exist which incorporate a USB interface. An integrated circuit (IC) is commonly known as a "chip" by the general public. An example of an IC which incorporates a USB interface is the Asahi Kasei Microsystems Co., Ltd AK5371 2-channel analog-to-digital converter with USB interface IC. The AK5371 series of chips are Certified USB™ as complying with USB Specification Rev. 1.1 and USB Device Class Definition for Audio Devices, Rev. 1.0. Another example is the BTM-CSR-FM8-C2 Bluetooth module IC provided by Perseus Technology International Corp. A wide variety of USB-compatible chips are offered for different functions and industries.

Manufacturers often purchase ICs in lots of thousands or tens of thousands in order to achieve volume discount pricing as well as establish continuity in their supply chain. The ICs are incorporated into the manufacturers' product lines over the course of months and sometimes years. Such product lines can include laptop computers, handheld PCs, printers, scanners, digital cameras, wireless keyboards and mice, automobile kits, headphones, and other industrial and consumer electronic gadgets and appliances.

As manufacturers come up with additional features to add to their products, backward compatibility with the subcomponents (e.g., ICs) within those products can be important. Consumers have come to expect backward compatibility for various devices, and industrial customers sometimes demand that future products be backward compatible before investing in a product line.

In video game systems, for example, communication between a video game console and a game input controller (e.g., controller, remote control, web camera, headset, keyboard, joystick, keypad, steering wheel and pedal, karaoke microphone, guitar, dance pad) can be accomplished through USB or other interface standards. Regardless of the interface standard, messages and message formats across the interface are predefined. Sometimes, the messages are defined well in advance of product release so that a team designing the console can prepare in relative isolation from a team designing the game input controller. Teams designing subsequent game controllers strive to meet the interface standards, sometimes running into difficulty in adding new features because the message formats do not have categories or room for the additional features.

After devices such as video game systems are released into the market, it is sometimes imperative for backward compatibility that no additional messages be added to the defined interface. For example, for a new wireless microphone, no additional messages across the serial USB interface may be added so that the new wireless microphone is compatible with the game which originally was sold with wired microphones.

In other devices, there may instead be a desire to obtain or provide additional communication functionality using a fixed standard. For example, designers of a backward-compatible webcam with fixed messages may wish to add a camera flash capability for which there are no messages. As another example, designers of a modem may wish to add encryption which is outside the normal message stream. As another example, a flashdrive designer may wish to add copy protection outside the previously defined messages.

BRIEF SUMMARY OF THE INVENTION

Embodiments in accordance with the present disclosure relate to using device states and/or signals of a device to provide additional coded communication over an otherwise fixed message interface. In particular, various embodiments utilize the suspend and resume states of a USB-compatible integrated circuit in order to pass messages from a remote node on the USB bus to the node which incorporates the integrated circuit. This is accomplished without adding new message formats to the bus.

Other embodiments in accordance with the present disclosure relate to using one or more analog-to-digital inputs of a USB integrated circuit in order to pass messages from the node on the USB bus which incorporates the integrated circuit to a remote node. This is also accomplished without adding new message formats to the bus.

One embodiment relates to a method of transmitting a message to a device using suspend and active states of the device. The method includes providing a host adapted to operatively connect to a device, pausing a communication signal from a host to a device for a time period sufficient to trigger the device into a suspend state, the host being operatively connected to the device, and restarting the communications signal from the host to the device for a time period sufficient to trigger the device into an active state. The method further includes repeating the pausing and restarting operations according to a predetermined pattern corresponding to a message, a timing between each of the suspend and active states of the device corresponding to a respective portion of the message and enabling the device to determine the message.

Another embodiment relates to transmitting a message through a Universal Serial Bus (USB)-compatible integrated circuit (IC) using USB suspend and resume states. The method includes sending a communication signal to a USB interface on an integrated circuit (IC), pausing the communication signal for a time period sufficient to trigger the IC into a USB suspend state, and restarting the communication signal for a time period sufficient to trigger the IC into a USB resume state. The method further includes repeating the pausing and restarting steps in a predetermined pattern corresponding to a message in which a timing of a variation between USB suspend and resume states enables a circuit monitoring the IC to determine the message.

Another embodiment relates to a circuit for transmitting a message through a Universal Serial Bus (USB)-compatible integrated circuit (IC) using USB suspend and resume states. The circuit includes a transmitting circuit operable to send start-of-frame (SOF) packets to a USB-compatible IC, pause the SOF packets for a time period sufficient to trigger the IC into a suspend state, restart the SOF packets for a time period sufficient to trigger the IC into a resume state, and repeat the pausing and restarting in a predetermined pattern corresponding to a message. A timing of a variation between suspend and resume states enables a circuit monitoring the IC to determine the message. The monitoring circuit can be on (e.g., applied to the same substrate) or offboard (e.g., on a separate chip from) the IC.

Another embodiment relates to a method of receiving a message through a Universal Serial Bus (USB)-compatible integrated circuit (IC) using USB suspend and resume states. The method includes receiving a communication signal to a USB interface on an IC, suspending the IC into a suspend state upon detecting a pause in the communication signal for a time period sufficient to trigger the IC into the suspend state, and resuming the IC into an active state upon detecting a restarting of the communication signal for a time period sufficient to trigger the IC into the active state. The method further includes determining a message encoded using a relative timing between the suspend states and resume states.

Another embodiment relates to a two-way communication device, including a bus interface having a suspend state and a resume state in which the bus interface is operative to enter the suspend state after a communication signal is suspended for at least a predetermined time period and enter the resume state after the communication signal is received. The device also includes an analog-to-digital (A/D) converter configured to provide digital data to the bus interface, an active component configured to provide an analog signal to the A/D converter, and a circuit operatively connected to the bus interface and to the active component in which the circuit is configured to determine a first message from a series of bus interface suspend and resume states. The circuit is also configured to repeatedly power down the active component in a predetermined pattern such that a series of spikes is generated in the digital data; the series of spikes corresponds to a second message.

Another embodiment relates to a method of transmitting a message from an active component configured to provide an analog signal to an analog-to-digital (A/D) converter, the A/D converter configured to provide digital data to a bus interface. The method includes powering down the active component such that a spike is generated in the analog signal and a digital adaptation of the spike is provided to the bus interface, powering up the active component to ready the active component for a power down, and repeating the powering down and powering up steps in a predetermined pattern corresponding to a message in which the powering down steps generate a series of spikes in the data, the series corresponding to the message.

Another embodiment relates to a method of transmitting a message through multiple analog-to-digital (A/D) converters to a bus interface. The method includes powering down m of n active components configured to provide analog signals to n A/D converters, the A/D converters configured to provide digital data to a bus interface such that one or more spikes are generated in the analog signals and a set of m digital adaptations of the spikes are provided to the bus interface in which the set of m digital adaptations of the spikes correspond to a message. Furthermore, n is an integer greater than or equal to 2 (i.e., $n \in I$, $2 \leq n$) and m is an integer greater than or equal to 1 and less than or equal to n (i.e., $m \in I$, $1 \leq m \leq n$).

Another embodiment relates to a method of receiving a message from a bus interface, in which the method includes receiving, from a bus interface, digital data including a series of digital adaptations of spikes corresponding to spikes in an analog signal, the series corresponding to a message, and determining the message from the timing of the digital adaptations of the spikes.

Another embodiment relates to a system for transmitting a message through an analog-to-digital (A/D) converter to a bus interface, the method including a bus interface, an A/D converter configured to provide digital data to the bus interface, an active component configured to provide an analog signal to the A/D converter, and a circuit configured to perform the steps of powering down the active component such that a spike is generated in the analog signal and a digital adaptation of the spike is provided to the bus interface. The circuit is also configured to perform the steps of powering up the active component and repeating the powering down and powering up steps in a predetermined pattern corresponding to a message in which the powering down steps generate a series of spikes in the digital data, the series corresponding to the message.

A further understanding of the nature and the advantages of the embodiments disclosed and suggested herein may be realized by reference to the remaining portions of the specification and the attached drawings.

DETAILED DESCRIPTION OF THE INVENTION

Communicating Using Suspend and Resume States

Figure 1:
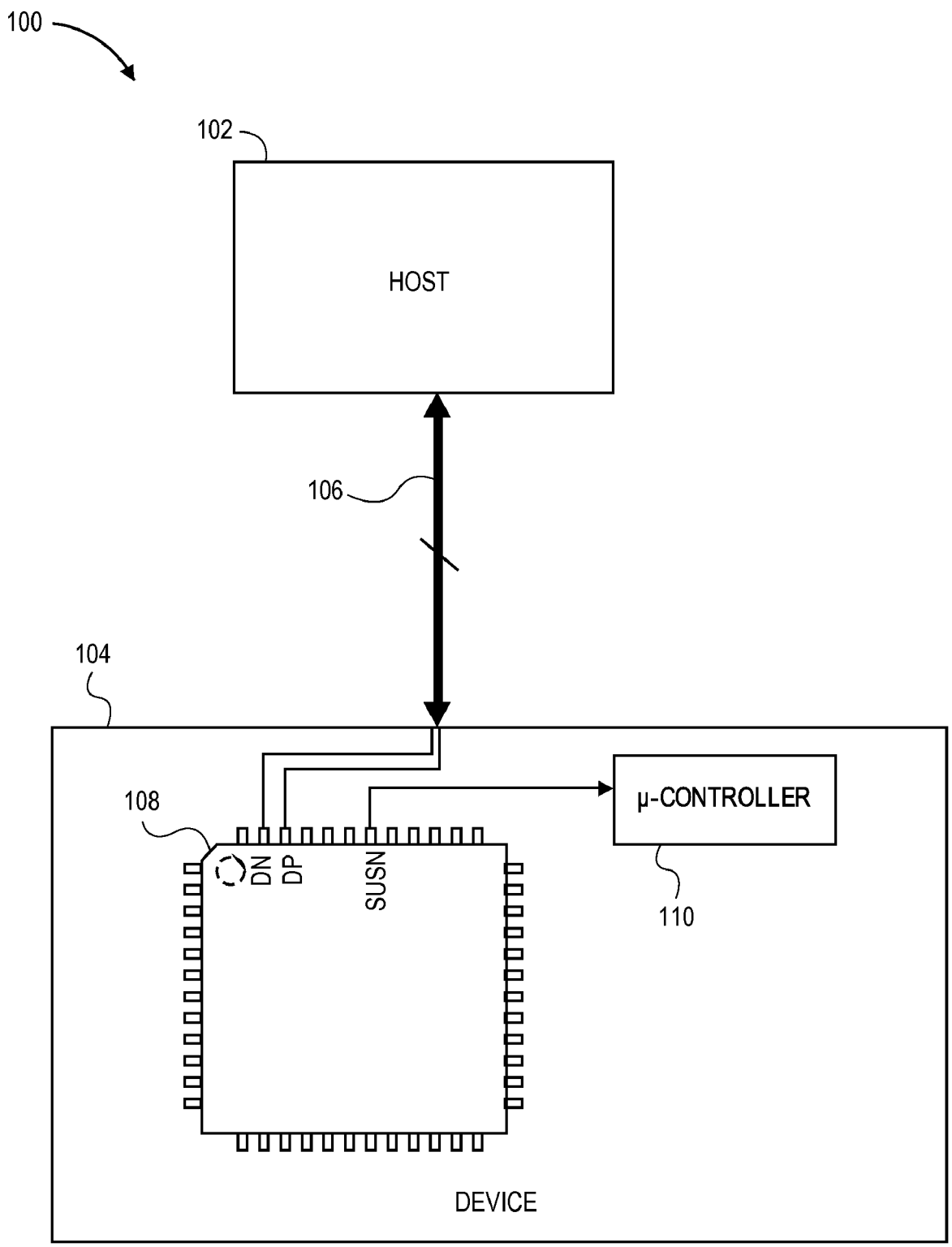
FIG. 1 illustrates a system for transmitting a message using device suspend and resume states corresponding to an embodiment.

FIG. 1 illustrates a system for transmitting a message through a device using suspend and resume states of the device according to an embodiment. System 100 includes host 102 and device 104 connected by bus 106. Bus 106 allows host 102 to transmit messages to device 104 and vice versa.

Device 104 includes integrated circuit (IC) 108, which is connected to bus 106 through pin DP and pin DN. Pin DP and pin DN are differential signal lines and act as an interface from/to IC 108 to/from bus 106.

IC 108 has a feature in which IC 108 can power down or sleep in a suspend state. A suspend state can be triggered when host 102 stops or pauses communicating to device 104 for a certain amount of time. IC 108 can be awoken or triggered into a resume state from the suspend state by host 102 restarting communications on bus 106. When IC 108 is in a suspend, resume, or other state, device 104 can be said to be in the same state as IC 108.

The term "trigger" is used in accordance with the plain meaning of the term, including one of a cause and effect relationship. The term "pause" is used in accordance with the plain meaning of the term, including a temporary stop which can include stopping or halting for microseconds, seconds, minutes, hours, etc.

To transmit a message using suspend and resume states of device 104, host 102, which normally transmits communication signals through bus-standard payload packets, pauses then restarts the bus-standard payload packets to device 104. Host 102 pauses the signal by not sending 'keep alive,' Start-of-Frame (SOF) packets, or other communications signals to device 104. Communications to other devices can be ongoing while communications to device 104 stop. The pause in communication signals is for a time period sufficiently long so that the IC (and thus the device) enters a suspend state. A suspend state is the same as a sleep, hibernation, low power, quiescent, electromagnetic pulse protection, etc. state. IC 108 is designed such that it is triggered into the suspend state after a pause in data traffic. By design, the suspend state is typically a power saving feature. Host 102 restarts the signal by sending keep alive, SOF packets, or other communications signals to device 104. The restart is for a time period sufficiently long so that the IC (and thus the device) enters a resume state. A resume state can be the same as a restart, active, reactivate, normal, full-power, operational, etc. state. The resume state can include a special, temporary resume state or a normal operations state.

Figure 2:
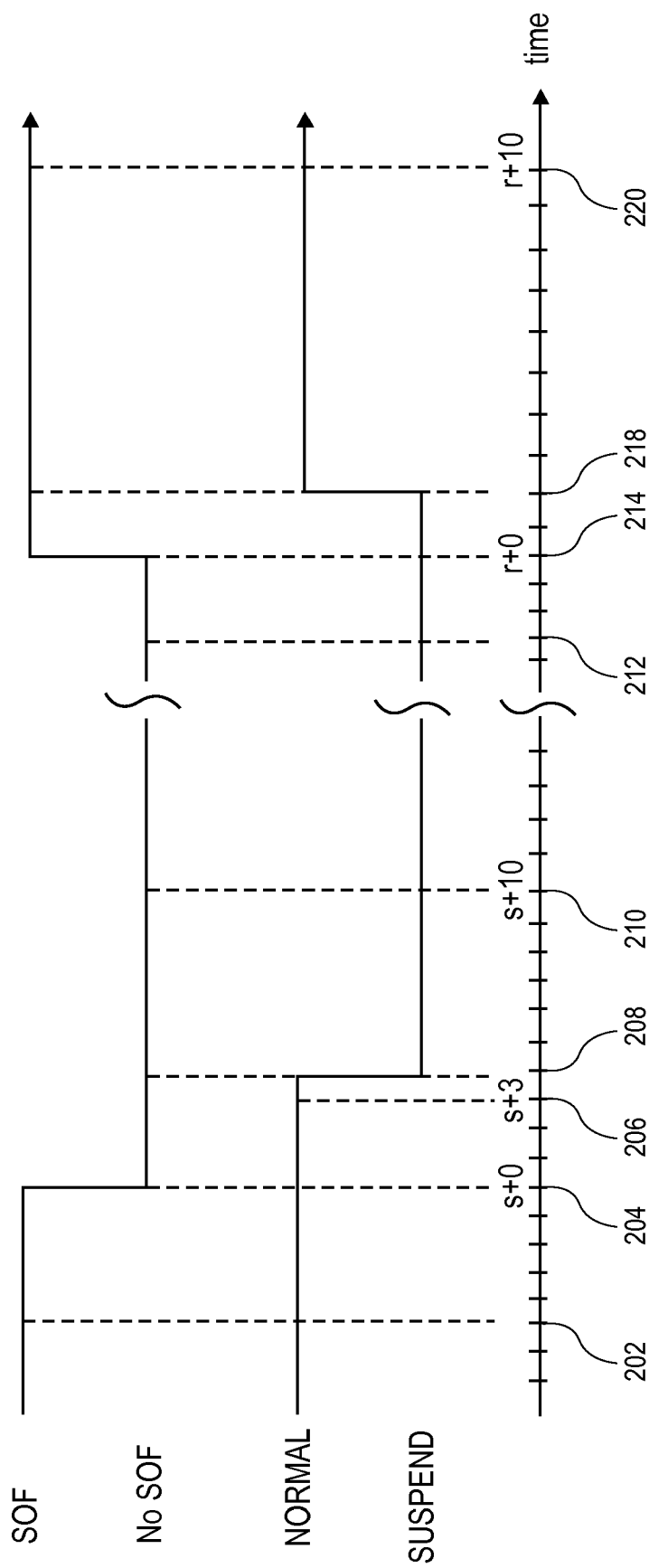
FIG. 2 illustrates the relative timing of USB Start-Of-Frame (SOF) packets and normal and suspend states of a device corresponding to an embodiment.

FIG. 2 illustrates the time reaction between the pausing and restarting of SOF packets and the resulting suspend and resume states on a USB-compatible device. The result of pausing SOF packets is shown on the left of the figure, while the result of restarting SOF packets is shown on the right.

Initially at time 202, SOF packets are being sent from the host to the device. At time 204 (i.e., s+0 msec), the host pauses, or temporarily stops transmitting or sending, SOF packets to the device. At time 206, no SOF packets have been sent for 3 milliseconds (msec). Sometime immediately after time 206 (i.e., s+3 msec) and before time 210 (i.e., s+10 msec), the device enters a suspend state at time 208 in compliance with the USB standard (for both full/high-speed and low-speed devices).

A suspend state for a USB-compatible device is normally a state in which the entire USB device draws ≦500 microamperes of current according to the current USB 2.0 specification. However, because the suspend state is only temporary in this embodiment, the device can draw >500 microamperes of current and still be considered in a suspend state. Furthermore, other maximum current draws may be incorporated in future USB specifications for the suspend state.

At time 212, no SOF packets are being sent from the host to the device, and the device is in a suspend state. The host may then place the bus in a resume state for at least 20 milliseconds followed by an End-of-Packet signal (not shown), although some hosts send the End-of-Packet signal after a few tenths of a millisecond. At time 214 (e.g., r+0), the host restarts, or starts transmitting or sending, SOF packets to the device. According to the USB 2.0 specification, the host-controller must allow the device at least 10 msec to recover from a resume. Therefore, sometime immediately after time 214 (i.e., r+0 msec) and before time 220 (i.e., r+10 msec), the device is awoken, or restarted into a resume state at time 218.

Figure 3:
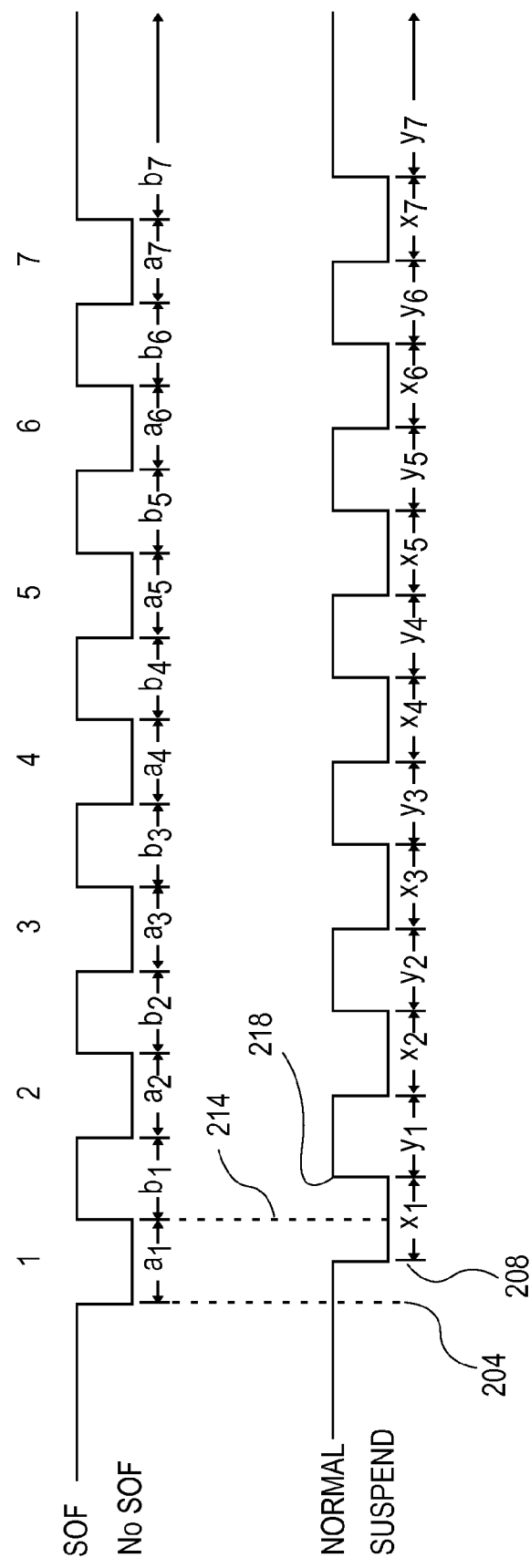
FIG. 3 illustrates the timing of a series of resume and suspend states of FIG. 2.

FIG. 3 illustrates the time reaction between several pauses and restarts of SOF packets and resulting suspends and resumes on a USB-compatible device. Times 204, 208, 214, and 218 correspond to the times in FIG. 2. Each pause and resume of the SOF packets can be identified by an index, such that the first pause/resume is index 1, the second pause/resume is index 2, etc.

The host in this example initially pauses SOF packets for time period a, starting at time 204 and resumes packets for time period $b_1$ at time 214. The result is that the device enters a suspend state for time period $x_1$ and then a resume state for time period $y_1$. The delay between the start of time period $a_1$ and the start of time period $x_1$ is the same as the delay between times 204 and 208 explained in FIG. 2. The delay between the start of time period $b_1$ and the start of time period $y_1$ is the same as the delay between times 214 and 218 explained in FIG. 2. The host then pauses for time period $a_2$ and restarts SOF packets for time period $b_2$. The result is that the device enters suspend and resume states for time periods $x_2$ and $y_2$, respectively.

The pausing and restarting is repeated in a predetermined pattern corresponding to a message. The time periods $a_1$, $b_1$, $a_2$, $b_2$, etc. thus can correspond to portions of a message. The time periods $x_1$, $y_1$, $y_2$, $y_2$, etc. correspond to the same message. For example, $x_i$'s and $y_i$'s both equaling 130 msec can correspond to "Get Microphone Button Status." As another example of a message, $x_i$'s and $y_i$'s (where i indicates an index number) both equaling 330 msec can correspond to "Request Receiver Signal Strength."

Repeating the pausing and restarting more than once (i.e., pausing and restarting 3 or more times) has been found to be effective to help a monitoring circuit distinguish between message-laden suspend states and normal power downs of the host and bus.

In some embodiments, time periods $a_i$ can differ from one another in order to correspond to a message. For example, time periods of $a_1$=130 msec and $a_2$=330 msec correspond to a single message. As another example, the delta time between $a_1$ and $a_2$ (i.e., +200 msec in the previous example) corresponds to a message. An increase/decrease in delta times (i.e., a chirp) of 3 or more time periods can also correspond to a message. Similarly, time periods $b_i$ can differ from one another in order to correspond with the message.

Additionally, the difference in time periods between $a_i$'s and respective $b_i$'s can also be used to convey a message. For example, the difference in time periods of $a_i$=13 msec and $b_i$=100 msec (i.e., +87 msec) can indicate a message. Conceivably, a wide variety of encoding schemes are available.

Suspend and resume time periods $x_i$ and $y_i$ correspond to the same message indicated by time periods $a_i$ and $b_i$. Using precise timings of time periods $a_i$ and $b_i$, time periods $x_i$ and $y_i$ can be controlled by the host. The precise timings of $x_i$ and $y_i$ are limited to the minimum times that a suspend or resume state must be entered before switching to the other state per the associated device specification.

Referring again to FIG. 1, pin SUSN ("suspend") on IC 108 conveys the state of IC 108 (i.e., resume, suspend, etc.). Microcontroller 110, which in the exemplary embodiment is part of device 104, monitors pin SUSN and decodes the message from time periods $x_i/y_i$. Microcontroller 110 determines the message through a lookup table or other functions.

Figure 4:
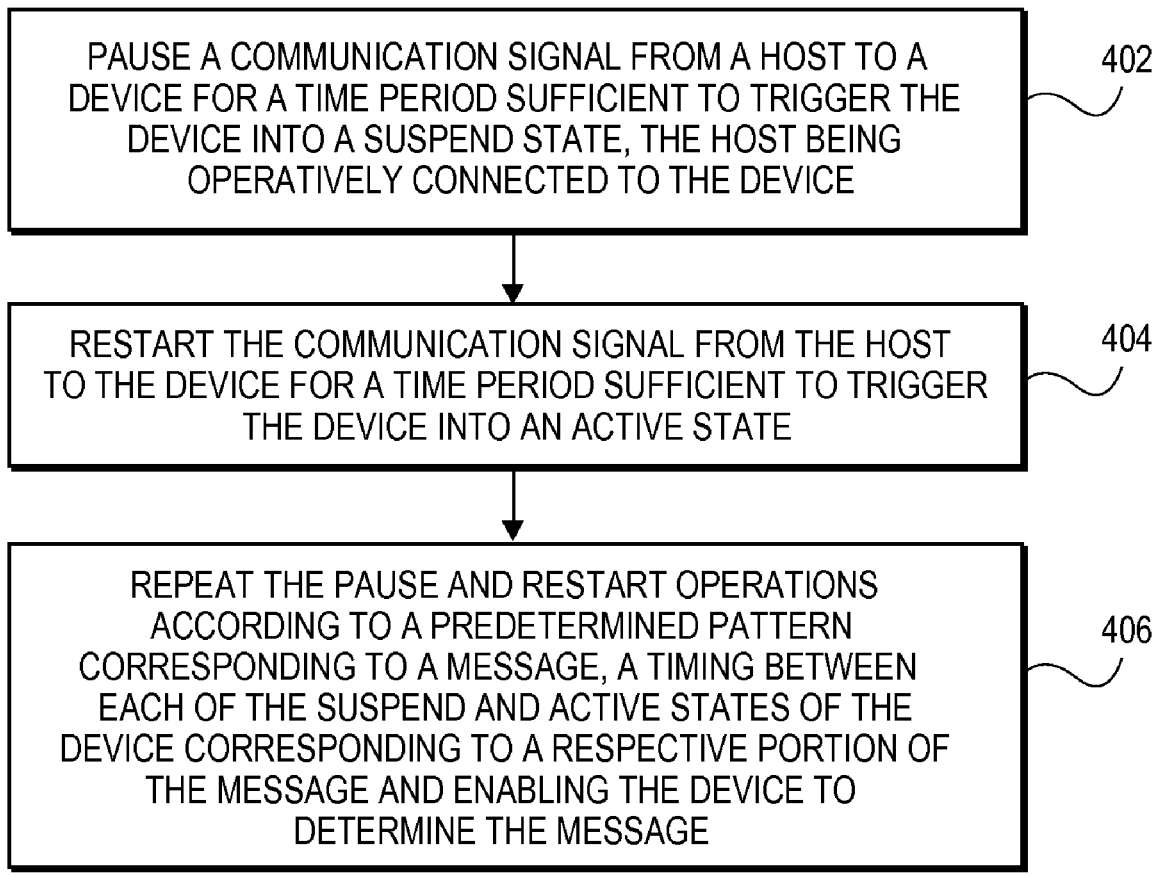
FIG. 4 is a flowchart illustrating an embodiment in accordance with the present invention.

FIG. 4. shows an example flowchart illustrating a process in accordance with one embodiment. In operation 402, communications are paused from a host to a device for a time period sufficient to trigger the device into a suspend state, the host being operatively connected to the device. For a Certified USB™ device, approximately 3 msec is the minimum time period sufficient to trigger the USB device into a suspend state. In operation 404 communications are restarted from the host to the device for a time period sufficient to trigger the device into an active state. For a Certified USB™ device, approximately 10 msec is the minimum time period sufficient to ensure that the device has gone back into the resume/active/normal state. In operation 406, the pause and restart of operations 402 and 404 are repeated in a predetermined pattern corresponding to a message. A timing between each of the suspend and active states of the device corresponds to the message, with the timing enabling a microprocessor or other circuit monitoring the device to determine the message.

System and methods of communicating through a device using the device's suspend and resume states have been shown. Although the exemplary embodiment references USB terminology (e.g., Start-of-Frame packets), one skilled in the art would recognize that the aspects described herein can be applied to non-USB devices, buses, and architectures such as, but not limited to IEEE 1394, HP-IL, RS-232, ATA, PCI, etc.

Communicating Using Spikes Through an A/D Converter

A "spike" is generally a quick surge in an electrical characteristic, such as voltage, current, power, etc. caused by the switching on or off of a component. A spike can include transients which are outside the nominal linear ranges of a component, such as ill-behaved discontinuities, or can include pseudo-ill-behaved surges which mimic ill-behaved switching transients. A spike can be within the nominal voltage or current ratings of a component, or may extend into regions outside those ranges for a brief period of time.

Figure 5:
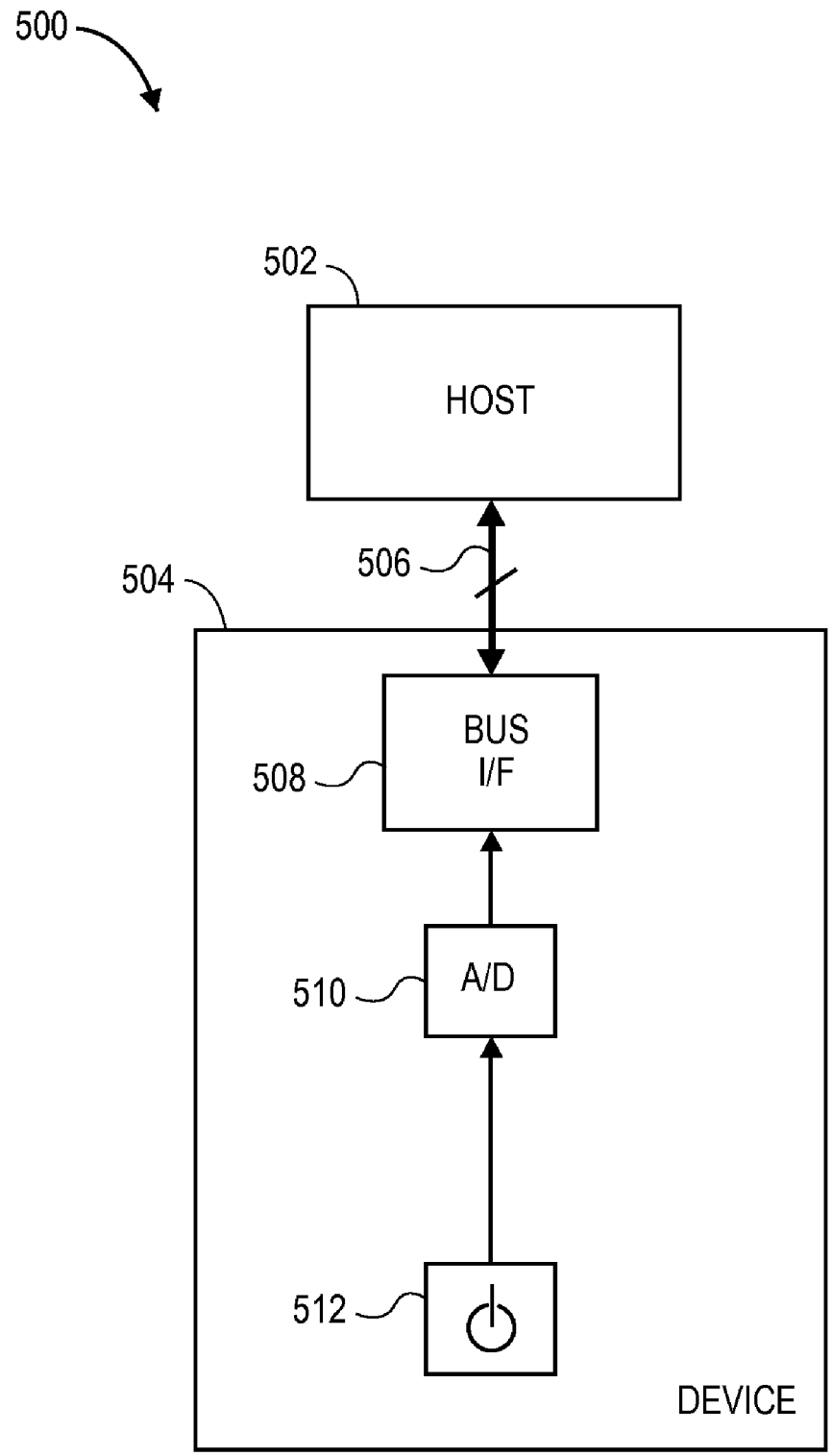
FIG. 5 illustrates a system for communicating a message using spikes through an A/D converter corresponding to an embodiment.

FIG. 5 illustrates a system for communicating a message using spikes through an analog-to-digital (A/D) converter corresponding to an embodiment. System 500 includes host 502 and device 504 connected by bus 506. Device 504 includes bus interface (I/F) 508 and A/D converter 510. A/D converter 510 converts analog signals from an input to digital data in its output. The output of A/D converter 510 provides digital data to bus interface 508.

Device 504 also includes active component 512. Active components include electrical components that are not completely passive, such as but not limited to digital-to-analog (D/A) converters, simple transistors, and other digital or analog components. Active component 512 provides an analog signal or signals to A/D converter 510.

Active component 512, which is powered, can be powered down. Powering down an active component, such as a D/A converter, can generate a spike of voltage and/or current in an output line. Powering down active component 512 results in a spike into A/D converter 510.

A/D converter 510 is kept nominally powered and attempts to convert the spike on its input line to a digital representation of the spike on its output line. The analog spike may, for an instant, extend well beyond the A/D converter's voltage and/or current ratings limits, or the analog spike may be within the limits of the A/D converter's voltage and/or current rating limits. The resulting digitalization of the spike on the output line(s) of A/D converter 510, typically substantially different than other data, can be referred to as a "digital adaptation" of a spike.

The digital adaptation of the spike is transmitted to bus interface 508, where the spike is provided to bus 506 and host 502. Bus interface 508 or other components (not shown) may process the digital adaptation of the spike before providing the spike to bus 506. Such processing can include normalizing the spike, performing a Laplace transformation, sharpening or filtering the spike for symmetry, or otherwise processing the digital adaptation of the spike.

FIGS. 6A-6D illustrate the relative timing of a power down of active component 512 and a digital adaptation of a spike according to an embodiment. At time 602, active component 512 is fully powered (see FIG. 6A). For simplicity in the example, no variable or "AC" signal is shown on the A/D input (see FIG. 6B), and thus no variable data is shown in the A/D output (see FIG. 6C). A spike has not yet been detected at time 602 (see FIG. 6D).

Figure 6:
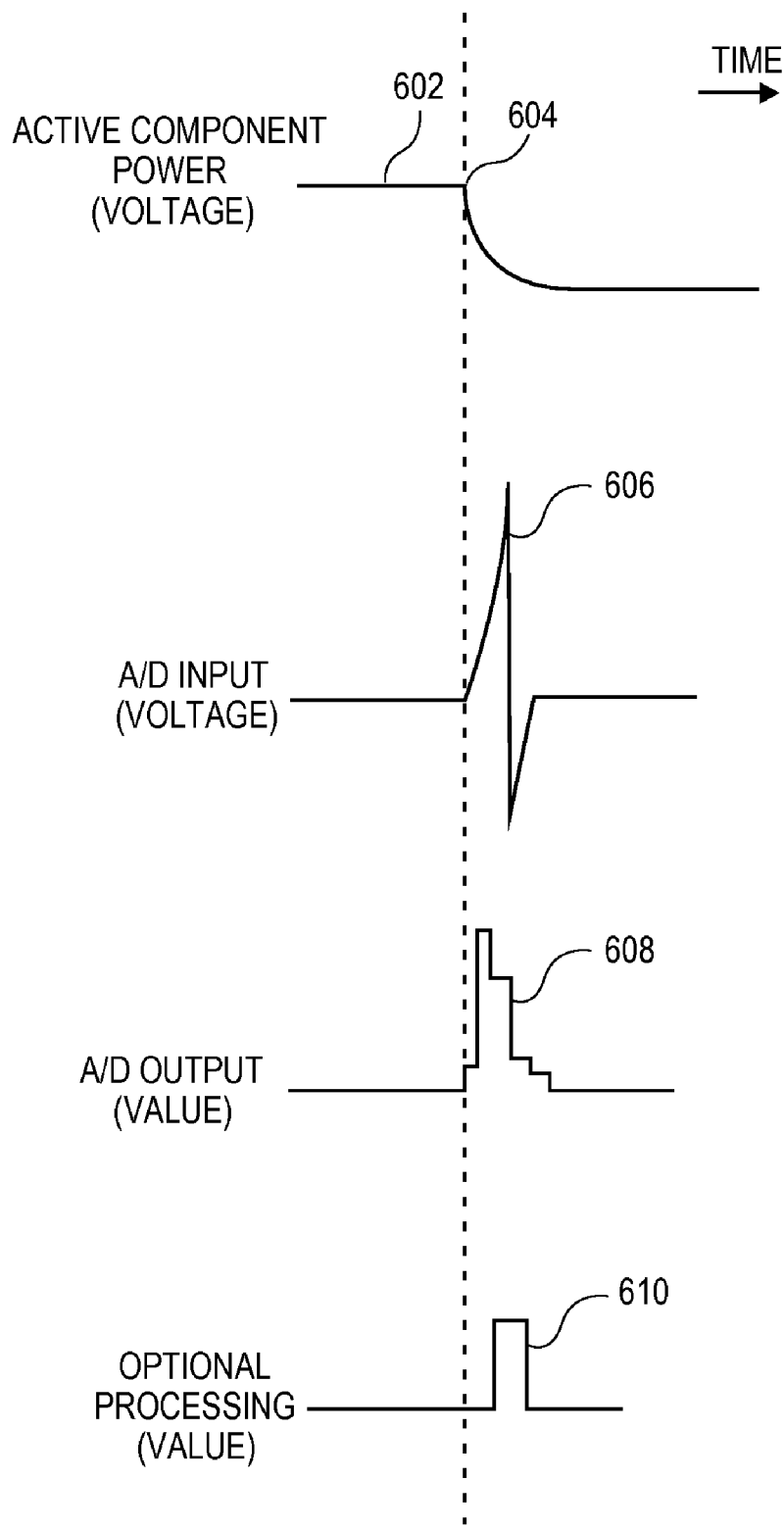
FIGS. 6A-6D illustrate the relative timing of a power down and digital adaptation of a spike according to an embodiment.

At time 604, the active component is powered down. Typically, the power profile of a powered down circuit is a monotonically decreasing, exponential decay as shown in FIG. 6A; however, the power profile may be of any downwardly tending profile, including profiles in which there are ripples or temporarily increasing power levels due to current supply eccentricities, circuit storage, reflections, and other transients.

Powering down the active component generates spike 606 of voltage (and/or current) in the analog signal of its output line. Accordingly, A/D converter 510 (see FIG. 5) observes spike 606 in its input line (see FIG. 6B). The A/D converter converts analog spike 606 to digital adaptation 608 of the spike. Digital adaptation 608 of the spike is represented by a sharp, blocky, pixilated spike in the exemplary embodiment; however, a digital adaptation of a spike can include any digitization of an analog spike, such as transients from a switching off a component. A/D converter 510 sends digital adaptation 608 of the spike to bus interface 508.

Optionally, digital adaptation 608 of the spike can be processed or otherwise converted. One conversion can simply involve filtering the digital adaptation of the spike so that the spike is cleaner and clearer, such as processed digital adaptation 610 of the spike (see FIG. 6D). The result can be a simple spike detection (i.e., 0 for no spike, 1 for spike detected). Processed digital adaptation 610 of the spike may be clearer to a receiving circuit than the raw, digitized spike which is simply a digitized analog signal which may be clipped or cut off. Processed digital adaptation 610 of the spike may be moved forward in time (i.e., phased) to compensate for the delay in the system determining the power down, although this is not necessary.

FIGS. 7A-7F illustrate the relative timing of a power down of active component 512 and a digital adaptation of the resulting spike along with signal data according to an embodiment. A variable ("AC") signal resembling analog voice audio is shown.

Figure 7:
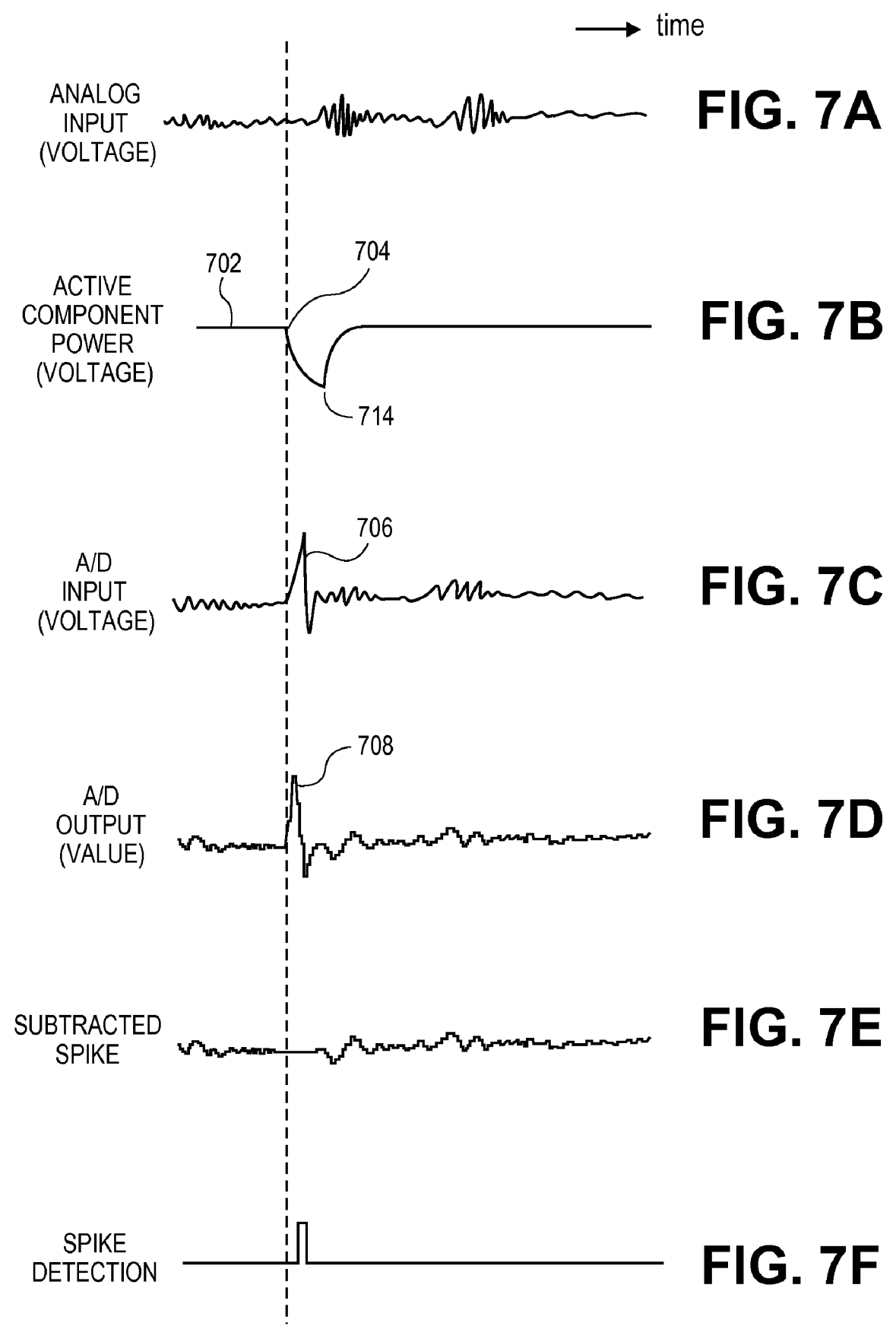
FIGS. 7A-7F illustrate the relative timing of a power down and digital adaptation of a spike according to an embodiment.

FIG. 7A illustrates the analog voice audio signal received by active component 512.

FIG. 7B illustrates power provided to active component 512. At time 702, the active component is fully powered. At time 704, the active component is powered down. At time 714, the active component is powered back up. The powering down at time 704 generates a spike; the powering up at time 714 does not generate a spike in this embodiment but may generate a spike in other embodiments.

As the analog signal passes through active component 512, the analog spike is added or otherwise modulated into the signal. FIG. 7C illustrates spike 706 added to the voice audio analog signal of FIG. 7A. Accordingly, A/D converter 510 observes spike 706 in its input line along with the voice audio signal (see FIG. 7A). The A/D converter converts analog spike 706 and the surrounding voice audio analog signal to digital adaptation 708 of the spike (see FIG. 7D), and sends digital adaptation 708 to bus interface 508.

In the exemplary embodiment, host 502 subtracts digital adaptation 708 of the spike from the digital data using digital filtering techniques (see FIG. 7E) and uses the remainder of the digital data for further processing or uses, such as playing to speakers. Because the digital adaptation of the spike is subtracted or canceled, the system avoids playing a loud 'click' or 'pop' in the speakers, and the audio stream retains most of its original quality.

In subtracting digital adaptation 708 of the spike from the sound data, host 502 can output or use the timing of the spike with reference to other spikes to decode a message as described below.

Figure 8:
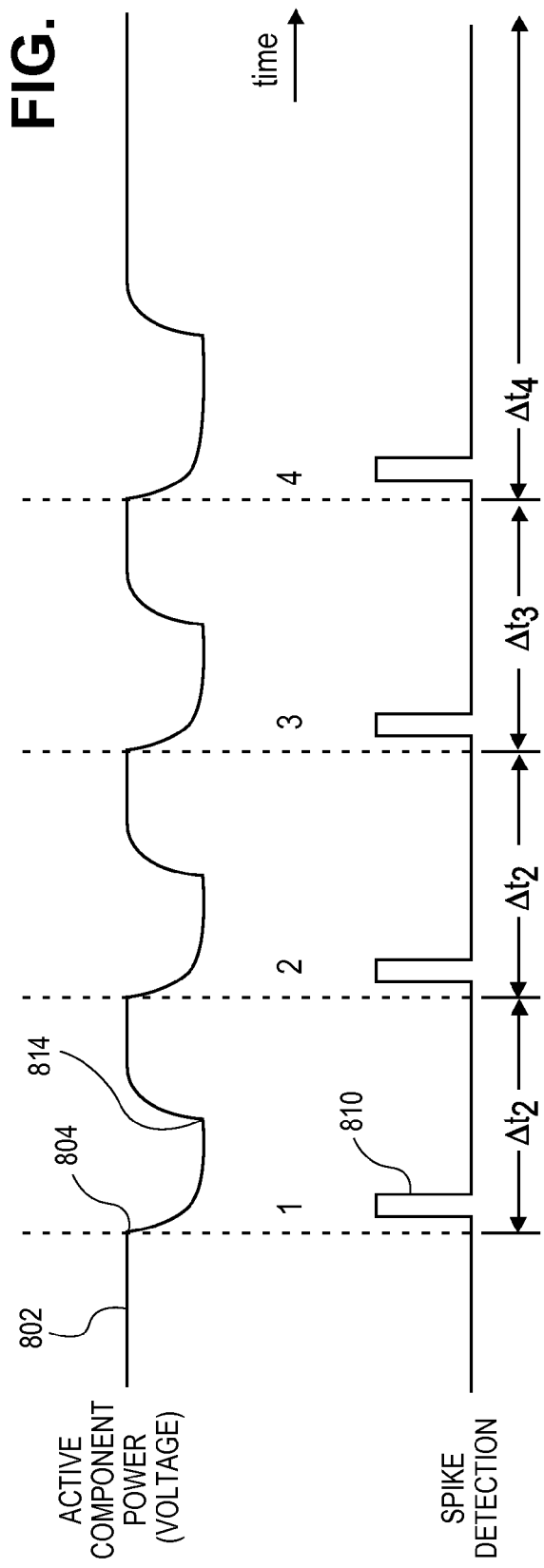
FIGS. 8A-8B illustrate the relative timing of a sequence of power downs and digital adaptations of spikes according to an embodiment.

FIGS. 8A-8B illustrate an example of the relative timing of multiple power downs of an active component and a sequence of digital adaptations of spikes. At time 802, active component 512 is fully powered. At time 804, the active component is powered off, and at time 814, the active component is powered on. The powering off and powering on is repeated in a predetermined pattern of delta times $\Delta t_i$, where i indicates an index number. In FIG. 8B showing an exemplary embodiment, delta times $\Delta t_i$, $\Delta t_2$, and $\Delta t_3$ are equal and $\Delta t_4$ merely indicates a 'timeout' delta time which indicates the end of the sequence.

Delta times $\Delta t_i$ can encode a message in several different ways. For example, the number of repeated $\Delta t_i$'s can indicate the message. As another example, the length of the delta times can indicate the message. As another example, the relative delta times can indicate a message. As yet another example, delta times can mimic Morse code, such that a short time followed by a long time indicates a dot-dash (i.e., the letter 'a'), a long time followed by three short times indicates a dash-dot-dot-dot (i.e., the letter 'b'), etc. Other encoding schemes (e.g., ASCII) with or without error checking (e.g., parity bits) are also envisioned as well as combinations and permutations of multiple encoding schemes.

Table 1 illustrates a simple coding scheme using the lengths of delta times to indicate a set of predefined messages. Power offs are repeated for approximately seven or eight times at equal spacings to ensure that the message is sent. A minimum of 1.2 msec between power offs is necessary for some ICs because the chips require at least 1.2 msec between power resets to avoid burnout. As should be understood, other minimum spacings could be required for other devices. Delta times are selected in a prime number increments so that if one of the spikes is inadvertently not generated by a power off, then the resulting 'double' delta time will not be confused with another message.

TABLE 1

| Length of Delta Time(s) msec | Corresponding Message |
| --- | --- |
| 1.2 | microphone button = off |
| 2 | microphone button = on |
| 3 | receiver strength = 0 |
| 5 | receiver strength = 1 |
| 7 | receiver strength = 2 |
| 11 | receiver strength = 3 |
| 13 | receiver strength = 4 |
| 17 | receiver strength = 5 |
| 19 | general fault |

As demonstrated above, a simple coding scheme allows a variety of messages to be sent and received by way of spikes.

Figure 9:
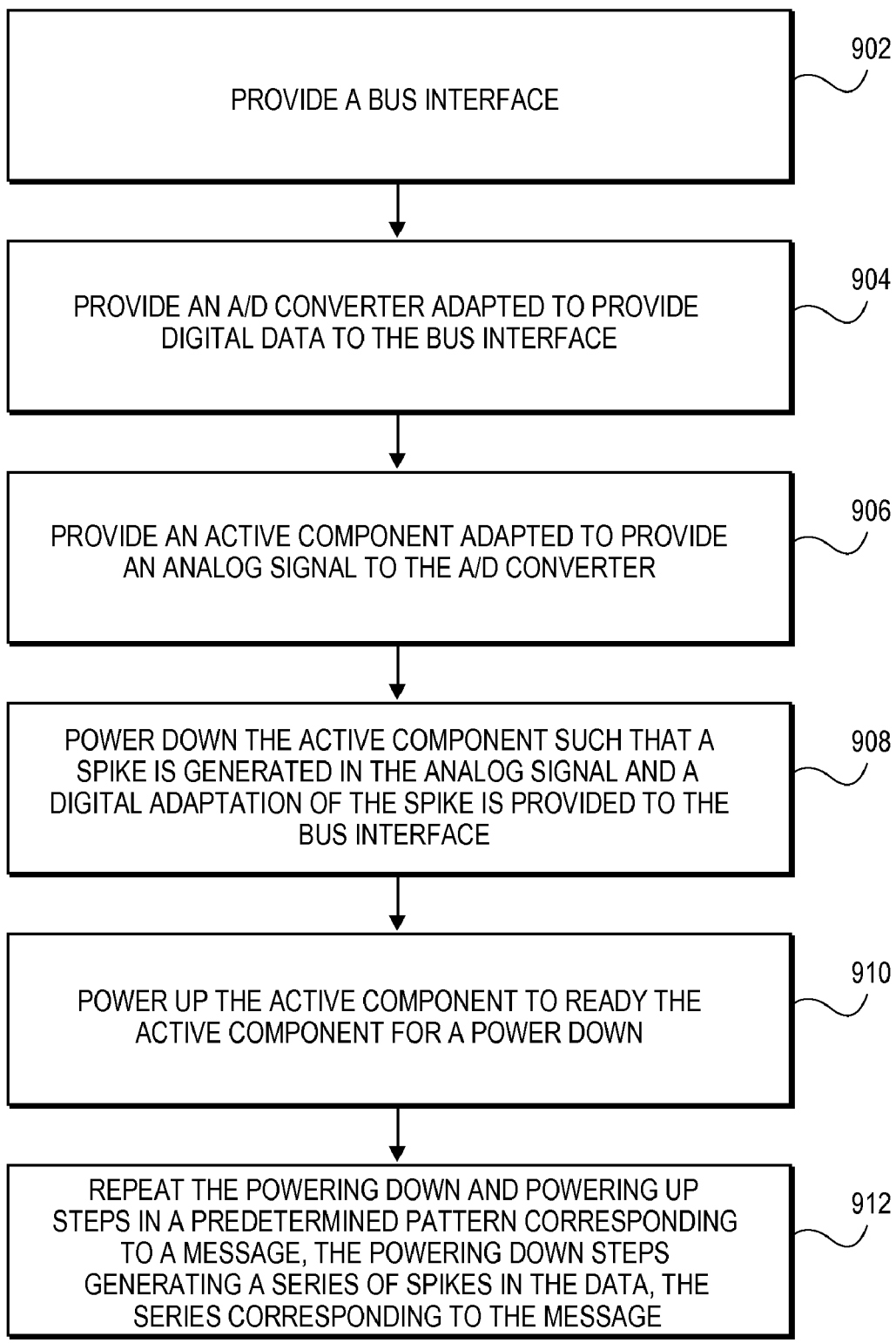
FIG. 9 is a flowchart illustrating an embodiment in accordance with the present invention.

FIG. 9. shows an example flowchart illustrating a process in accordance with one embodiment. In operation 902, a bus interface is provided. In operation 904, an A/D converter is provided which is adapted to provide digital data to the bus interface. In operation 906, an active component is provided which provides an analog signal to the A/D converter. In operation 908, the active component is powered down such that a spike is generated in the analog signal and a digital adaptation of the spike is provided to the bus interface. In operation 910, the active component is powered up to ready the active component for another power down. In operation 912, the powering down and powering up steps are repeated in a predetermined pattern corresponding to a message. The powering down steps generate a series of spikes in the data in which the series corresponds to the message.

As described below, instead of using a temporal sequence of spikes caused by the powering down of one active component, a simultaneous sequence of spikes from a selected set of multiple active components can also indicate a message.

Figure 10:
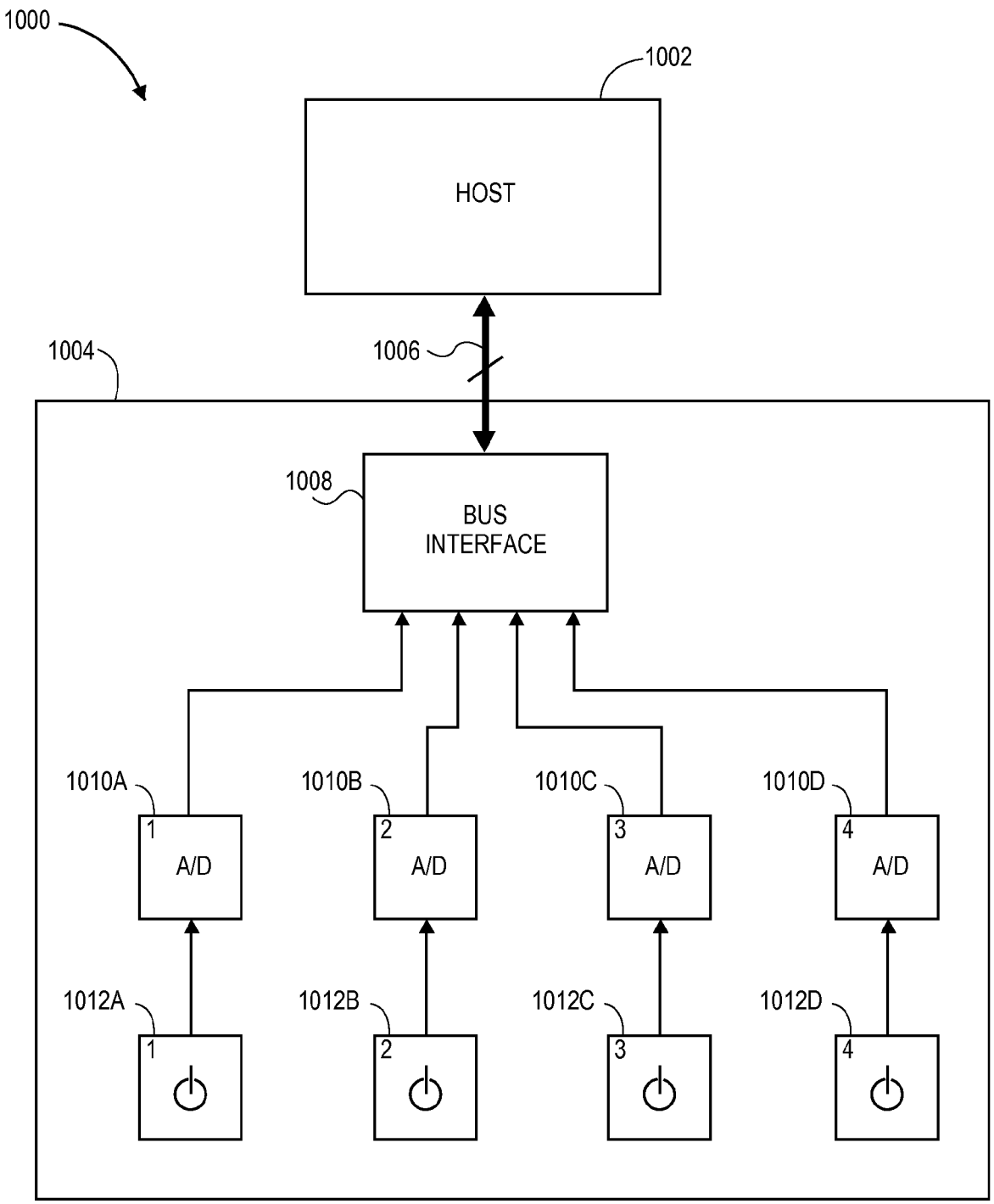
FIG. 10 illustrates a system for communicating a message using spikes through multiple A/D converters corresponding to an embodiment.

FIG. 10 illustrates a system for communicating a message using spikes through multiple A/D converters corresponding to an embodiment. System 1000 includes host 1002 and device 1004 connected by bus 1006. Device 1004 includes bus interface 1008 which connects to bus 1006.

Device 1004 also includes multiple A/D converters 1010A through 1010D whose analog inputs are provided by active components 1012A through 1012D, respectively. In this respect, n=4 active components provide analog signals to n=4 A/D converters.

All or a subset of the active components are powered down such that a set of spikes are generated in the analog signal, and digital adaptations of the spikes are provided to the bus interface. That is, m of the n active components are powered down, where m is an integer between 1 to n and may or may not indicate which particular active components are powered down.

A corresponding message can be indicated by how many or which particular m active components are powered down. For example, a spike from powering down 1 of the 4 active components can indicate a first message, while spikes from powering down all 4 of the 4 active components can indicate another message. As another example, the particular set of m active components which are powered down can indicate a message. Table 2 illustrates a simple coding scheme using particular subsets of active components.

TABLE 2

| Active Component (no spike = 0; spike = 1) | | | | Corresponding Message |
|---|---|---|---|---|
| a | b | c | d | |
| 0 | 0 | 0 | 1 | microphone button = off |
| 0 | 0 | 1 | 0 | microphone button = on |
| 0 | 1 | 0 | 0 | receiver strength = 0 |
| 0 | 1 | 0 | 1 | receiver strength = 1 |
| 0 | 1 | 1 | 0 | receiver strength = 2 |
| 0 | 1 | 1 | 1 | receiver strength = 3 |
| 1 | 0 | 0 | 0 | general fault |

In addition to utilizing the set m of n active components powered off to distinguish messages, a sequence of sets m (i.e., $m_1, m_2, m_3, \ldots, m_r$) can also be used to distinguish different messages. A wide variety of messages can thus be indicated.

Two-Way Communication Using The Methods Above

Figure 11:
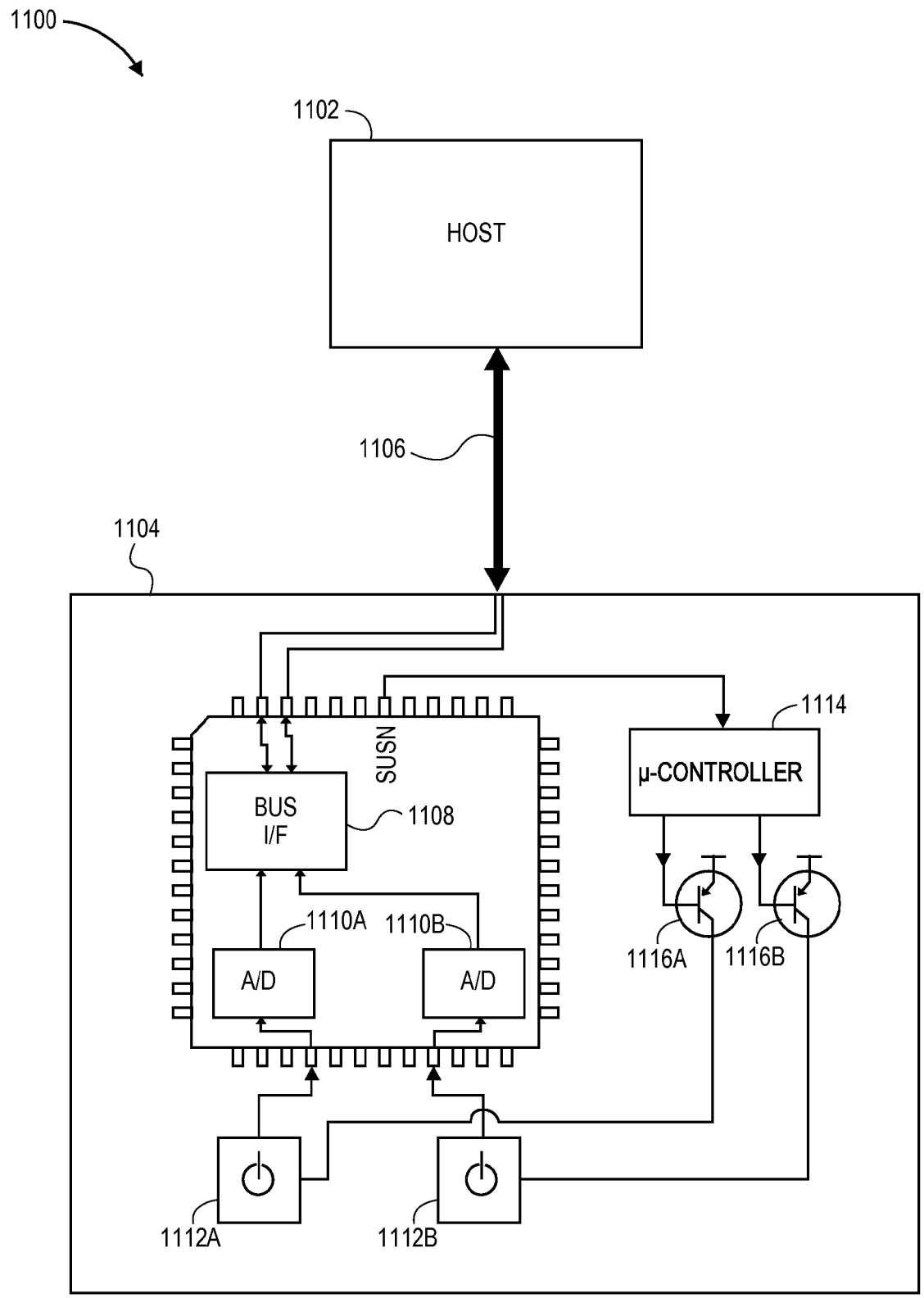
FIG. 11 illustrates a system with two-way communication according to an embodiment.

Two-way, bi-directional communication can be accomplished using both the suspend/resume methods and the spike methods described above. FIG. 11 shows a system with two-way communication. Communication system 1100 includes host 1102, device 1104, and bus 1106. Device 1104 includes bus interface (I/F) 1108 which is supplied digital data from dual A/D converters 1110A and 1110B. A/D converters 1110A and 1110B are supplied analog signals from active components 1112A and 1112B, respectively.

Microcontroller 1114 monitors the state (i.e., suspend, resume, etc.) of bus interface 1108. Microcontroller 1114 controls power to active components 1112A and 1112B through transistors 1116A and 1116B, respectively. Although simplified P-channel bipolar junction transistor (BJT) circuits are shown, other transistor types and other circuits for controlling and filtering power can be used for controlling power to the active components.

Host 1102 sends messages to microcontroller 1114 by stopping and restarting communications on bus 1106 to device 1104, thereby causing bus interface 1108 and the chip on which bus interface is located to enter suspend and resume states. Microcontroller 1114 interprets the suspend and resume states as a message. This communication is in addition to normal message traffic on bus 1106, for which defined message formats may not be alterable due to backward compatibility, EEPROM programming, and other technical, schedule, cost, and managerial concerns.

Microcontroller 1114 sends messages back to host 1102 by powering down and powering up active components 1112A and 1112B either together or variably. Spikes in the analog signal are converted to digital adaptations of the spikes by A/D converters 1110A and 1110B before being provided to bus interface 1108. Host 1102 interprets the digital adaptations of the spikes from the analog channels as a message. Host 1102 can filter out or subtract the spikes so that the surrounding data signal can be used. This communication from microcontroller 1114 to host 1102 is in addition to normal message traffic on bus 1106.

Two-way communication can include a simple control message with an acknowledgement (i.e., "ACK") that the message was safely received. Communication can also include more complex handshaking with wakeup pulse trains, header data, and cyclic redundancy checks (CRC). The communication can include simple back and forth messages, packetized messages, messages to be routed to other devices, and encryption.

Figure 12:
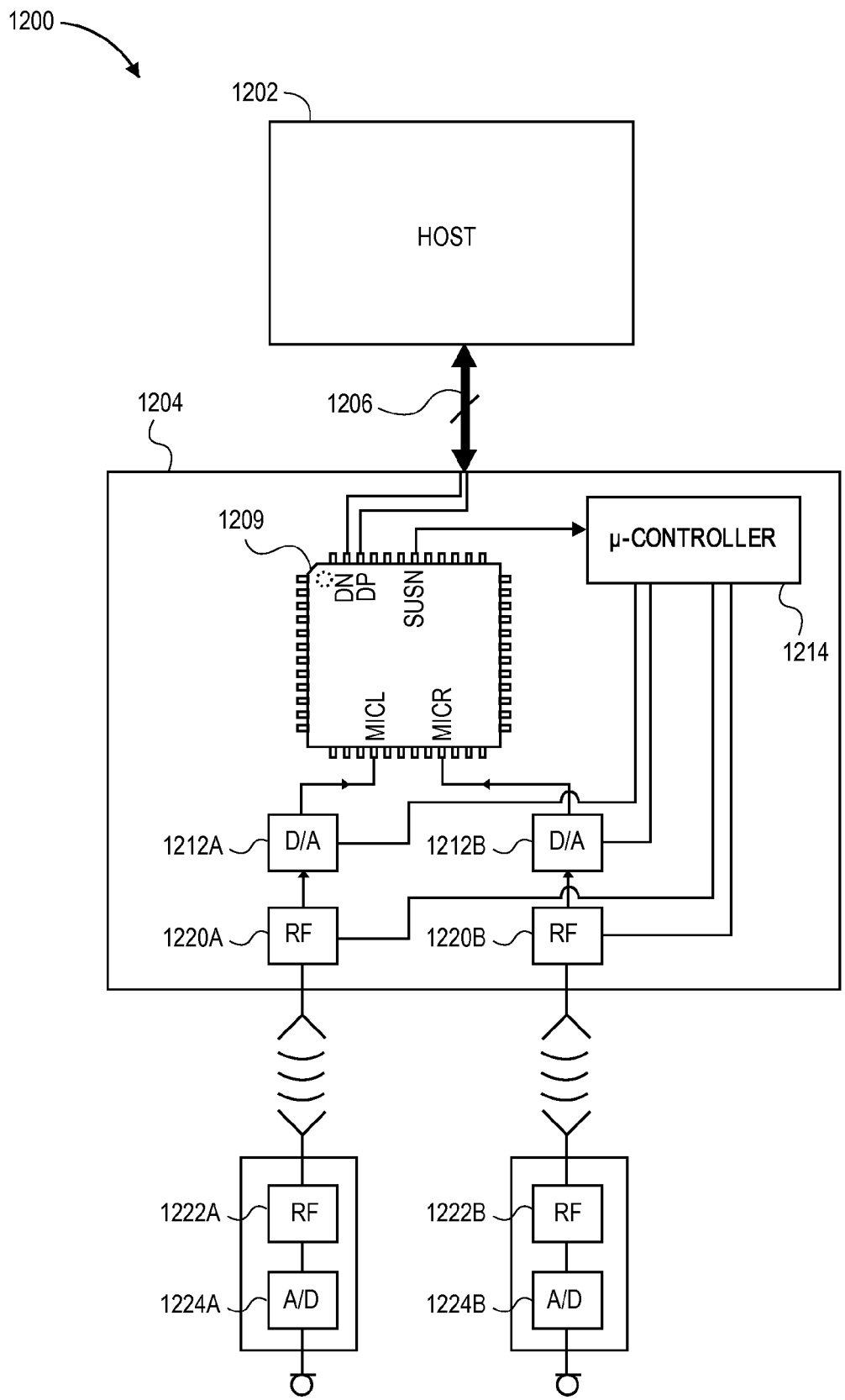
FIG. 12 illustrates a USB communication system with two-way communication according to an embodiment.

FIG. 12 shows a practical application of two-way communication in a video game system using USB to communicate with a wireless device such as one or more wireless microphones. USB communication system 1200 includes host 1202, device 1204, and bus 1206. Digital-to-analog (D/A) converters 1212A and 1212B supply analog signals to the left and right analog microphone inputs (MICL and MICR) on USB-compatible integrated circuit (IC) 1209.

Radio frequency (RF) transceivers 1220A and 1220B supply digital data to D/A converters 1212A and 1212B and are also connected to microcontroller 1212. RF transceivers 1220A and 1220B communicate wirelessly to remote RF transceivers 1222A and 1222B. Remote RF transceivers 1222A and 1222B are in turn supplied digital data from A/D converters 1224A and 1224B, which in turn are supplied analog signals from condenser microphones.

In the video game system, previous versions of microphones used wires to connect with a device such as device 1204. Message formats for the microphones are defined and difficult to change without introducing problems with backward compatibility. Therefore, reporting the status of new features, such as the signal strength of the RF, would be difficult to perform using the previously allocated message formats.

USB communication system 1200 uses suspend/resume states of chip 1209 to request wireless signal strength from microcontroller 1214, and microcontroller 1214 communicates wireless strength back to host 1202 using the spike method through MICL and MICR inputs.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

What is claimed is:

1. A method of transmitting a message from a digital-to-analog (D/A) converter configured to provide a first type of communication using an electrical analog signal to an analog-to-digital (A/D) converter electrically connected with the D/A converter, the A/D converter configured to provide digital data to a bus interface, the method comprising:
   powering down the D/A converter such that a voltage spike is generated in the analog signal and a digital adaptation of the spike is provided to the bus interface;
   powering up the D/A converter to ready the powered active component for a power down; and
   repeating the powering down and powering up steps to form a second type of communication according to a predetermined pattern corresponding to a message, the powering down steps generating a series of spikes in the data corresponding to the message.

2. The method of claim 1 wherein the message is determined by a frequency of the spikes.

3. The method of claim 1 wherein the message is determined by durations of the spikes.

4. The method of claim 1 wherein the message is a wakeup message corresponding to a start of a larger transmission.

5. The method of claim 1 wherein the message is header data indicating a duration of a subsequent message.

6. The method of claim 1 wherein the message includes a cyclic redundancy check (CRC).

7. The method of claim 1 wherein the bus interface and A/D converter are on the same integrated circuit.

8. The method of claim 1 further comprising:

powering down a second D/A converter configured to provide a second analog signal to a second A/D converter connected with the second D/A converter, the second A/D converter configured to provide digital data to the bus interface such that a spike is generated in the second analog signal and a second digital adaptation of the spike is provided to the bus interface;

powering up the second D/A converter; and repeating the powering down the second D/A converter and then powering up the second D/A converter in a second predetermined pattern corresponding to the message, the powering down of the second D/A converter steps generating a second series of spikes in the data corresponding to the message, wherein both series of spikes are necessary to distinguish the message.

9. The method of claim 8 wherein both series of spikes in the data occur simultaneously.

10. The method of claim 8 wherein the powering down steps of the first and second D/A converter occur simultaneously.

11. A method of transmitting a message through multiple analog-to-digital (A/D) converters to a bus interface using a first communication type, the method comprising powering down m of n digital-to-analog (D/A) converters configured to provide electrical analog signals to n A/D converters electrically connected with the D/A converters, the n A/D converters configured to provide digital data to a bus interface such that one or more voltage spikes are generated in the analog signals and a set of m digital adaptations of the spikes are provided to the bus interface, the set of m digital adaptations of the spikes corresponding to a message using a second communication type, wherein n is an integer greater than or equal to 2 and m is an integer greater than or equal to 1 and less than or equal to n.

12. The method of claim 11 wherein the number of m D/A converters powered down corresponds to the message.

13. The method of claim 11 wherein the particular m D/A converters powered down correspond to the message.

14. The method of claim 11 further comprising powering down k of the n D/A converters such that one or more spikes are generated in the analog signals and a set of k digital adaptations of the spikes are provided to the bus interface, the set of k digital adaptations of the spikes corresponding to the message, wherein both sets of m and k digital adaptations of spikes are necessary to distinguish the message.

15. The method of claim 11 wherein the bus interface and A/D converters are on the same integrated circuit.

16. A system for transmitting a message through an analog-to-digital (A/D) converter to a bus interface, the method comprising:

a bus interface;

an A/D converter configured to provide digital data to the bus interface;

a powered active component configured to provide an electrical analog signal to the A/D converter, the powered active component electrically connected with the A/D converter through at least one signal line and supplied power through at least one non-signal line; and a circuit configured to perform the steps of powering down the powered active component through the at least one non-signal line such that a voltage spike is generated in the analog signal and a digital adaptation of the spike is provided to the bus interface, powering up the powered active component through the at least one non-signal line, and repeating the powering down and powering up steps in a predetermined pattern corresponding to a message, the powering down steps generating a series of spikes in the digital data, the series corresponding to the message.

17. The system of claim 16 wherein the powered active component includes a Universal Serial Bus (USB)-compatible integrated circuit (IC), wherein the circuit is configured to power down and up the USB-compatible IC.

18. The method of claim 1 wherein the D/A converter includes a Universal Serial Bus (USB)-compatible integrated circuit (IC), wherein the USB-compatible IC is powered up and down.

19. The method of claim 1 wherein the powering down and up of the D/A converter occurs through power supply lines to the D/A converter, and the series of spikes is generated in differential signal lines from the D/A converter.

20. The method of claim 11 wherein the powering down m of n D/A converters occurs through non-signal, power lines to the D/A converters, and the one or more voltage spikes are generated in analog signals that are separate from the non-signal lines.

* * * * *